US009224272B2

(12) United States Patent
Morris et al.

(10) Patent No.: US 9,224,272 B2
(45) Date of Patent: Dec. 29, 2015

(54) METHOD OF SECURE DATA COMMUNICATION

(75) Inventors: Stuart Leslie Morris, Reading (GB); Norman MacAskill Fraser, Surrey (GB); Sanjay Shantilal Haria, Edgware (GB)

(73) Assignee: Tricerion Ltd., Surrey (GB)

( * ) Notice: Subject to any disclaimer, the term of this patent is extended or adjusted under 35 U.S.C. 154(b) by 3097 days.

(21) Appl. No.: 11/177,201

(22) Filed: Jul. 8, 2005

(65) Prior Publication Data

US 2006/0037067 A1    Feb. 16, 2006

(30) Foreign Application Priority Data

Jul. 9, 2004   (GB) .................................. 0415448.0
Mar. 7, 2005   (GB) .................................. 0504545.5

(51) Int. Cl.
| H04K 1/00 | (2006.01) |
| G07F 19/00 | (2006.01) |
| G06Q 20/10 | (2012.01) |
| G06Q 20/32 | (2012.01) |
| G07F 7/10 | (2006.01) |

(52) U.S. Cl.
CPC ................ *G07F 19/20* (2013.01); *G06Q 20/10* (2013.01); *G06Q 20/3224* (2013.01); *G07F 7/1008* (2013.01); *G07F 7/1016* (2013.01); *G07F 7/1025* (2013.01); *G07F 7/1041* (2013.01); *G07F 19/201* (2013.01); *G07F 19/207* (2013.01); *G07F 19/211* (2013.01)

(58) Field of Classification Search
CPC .............................. H04L 63/0428; H04L 9/08
USPC ......... 713/182–186, 202, 194, 165, 155, 168;
380/28–30, 44; 726/2, 14, 9, 20
See application file for complete search history.

(56) References Cited

U.S. PATENT DOCUMENTS 4,479,112 A    10/1984   Hirsch
5,949,348 A    9/1999    Kapp et al.
(Continued)

FOREIGN PATENT DOCUMENTS

| FR | 2819067 | 7/2002 |
| GB | 2 387 702 A | 10/2003 |

(Continued)

OTHER PUBLICATIONS

International Preliminary Report on Patentability in PCT/GB2006/050002.
(Continued)

*Primary Examiner* — Anthony Brown
(74) *Attorney, Agent, or Firm* — Global IP Counselors, LLP

(57) ABSTRACT

In an exchange of data between a client terminal (1) and a secure database server (2) the data is encoded using positional information generated by a combination generator (7) in a separate security server (3). The positional information is used to produce an image specific to a communication event which is accessed by the client terminal (1) and is the basis for the entry of sensitive data at the client terminal (1). The three-way communication link between the client terminal, database server and security server greatly increases the difficulty of successfully intercepting and decoding the data entered at the client terminal. This method of secure data communication is particularly suited to the communication of password data for example in the banking industry.

22 Claims, 7 Drawing Sheets

(56) References Cited

U.S. PATENT DOCUMENTS

| | | | |
|---|---|---|---|
| 6,209,104 B1 * | 3/2001 | Jalili | 726/18 |
| 6,684,269 B2 * | 1/2004 | Wagner | 709/203 |
| 7,305,548 B2 * | 12/2007 | Pierce et al. | 713/155 |
| 2002/0188872 A1 | 12/2002 | Willeby | |
| 2003/0182558 A1 * | 9/2003 | Lazzaro et al. | 713/183 |
| 2003/0210127 A1 | 11/2003 | Anderson | |
| 2004/0030934 A1 * | 2/2004 | Mizoguchi et al. | 713/202 |
| 2004/0064711 A1 | 4/2004 | Fernando et al. | |
| 2005/0064846 A1 * | 3/2005 | Karaoguz et al. | 455/411 |

FOREIGN PATENT DOCUMENTS

| | | |
|---|---|---|
| WO | WO01/06338 A2 | 1/2001 |
| WO | WO 01/41090 A1 | 6/2001 |

OTHER PUBLICATIONS

Written Opinion of the International Searching Authority in PCT/GB2006/050002.

Dhamija et al., "Dé já Vu: A User Study Using Images for Authentication"; Proceedings of the $9^{th}$ USENIX Security Symposium, Aug. 14-17, 2000.

* cited by examiner

METHOD OF SECURE DATA COMMUNICATION

CROSS-REFERENCE TO RELATED APPLICATIONS

This application claims the benefit of United Kingdom patent application Nos. 0415448.0, filed Jul. 9, 2004, and 0504545.5, filed Mar. 7, 2005, the entire content of both being incorporated herein by reference.

BACKGROUND OF THE INVENTION

1. Field of the Invention

The present invention relates to a method of secure data communication and to a system employing such a method. In particular, the present invention relates to a method of communicating data between a client terminal and a remote server which prevents effective unauthorised interception of the data being communicated and in the case of encrypted data therefore presents a negligible risk of the encrypted data being decoded. The present invention is particularly well suited, but not exclusively, to financial applications such as ATMs and online banking in which authorisation data for accessing secure financial data is transmitted by client terminals over potentially non-secure communication links to a remote server where the authorisation data is then verified.

2. Description of the Related Art

Naturally, it is important that access to secure data is only granted to authorised personnel. However, in many fields the need for security must be balanced with the need for quick and remote access of the data. For example, the ability of a hospital's accident and emergency team to access immediately a patient's private medical records can prove life-saving. In the case of bank customers, they now demand that they have quick and easy access to their funds without being obliged to visit a branch of the bank during normal working hours. To this end, secure systems have been developed which hold data on secure database servers and which permit access to the data via remote client terminals.

In such secure systems, the identity of a user is generally verified through the use of authorisation data, e.g. username, password or a personal identification number (PIN), which is sent between the client terminal and the database server. Although measures may be taken by the user of a client terminal to ensure that the authorisation data remains secret, the authorisation data may nevertheless be observed by others as it is entered by the user or it may be electronically intercepted at some point between the client terminal and the database server.

Unauthorised access to financial data, such as a person's bank details, clearly carries financial rewards making it the target of increasing criminal activity. Currently, many credit or debit cards employ a magnetic strip or an electronic chip which carries part of the cardholder's authorisation data. The remainder of the authorisation data is known to the cardholder for example in the form of a PIN. When the card is inserted into an automated teller machine (ATM) or credit card "PDQ" machine, the information stored on the magnetic strip or electronic chip as well as the PIN entered by the cardholder are passed to a remote database server, or a separate authorisation server, for verification. If the authorisation data is correct, the cardholder is granted access to his financial data.

A simple form of card fraud is to observe the cardholder entering his PIN at an ATM and then to steal the card. Alternatively, rather than stealing the card which will naturally alert the cardholder, the data stored on the card may be copied using publicly-available magnetic-card readers during financial transactions. The copied card may then be used to make purchases and cash withdrawals without drawing the attention of the cardholder or bank.

Smart cards offer significant security advantages over magnetic-strip cards in that all authorisation data, including the PIN, are stored on the card in encrypted form. This makes card copying during financial transactions practically impossible. Moreover, if a card is stolen it is extremely difficult and time-consuming for criminals to access the PIN stored on the card. Nevertheless, card fraud is still possible by observing the cardholder entering his PIN and subsequently stealing the card. This form of card fraud is particularly relevant to smart cards in which a PIN, rather than a signature, is used for everyday electronic point-of-sale (EPOS) transactions. As a result, the chances of a cardholder's PIN being observed are increasing.

FR 2819067 describes an EPOS terminal for use with a smart card and comprises a touch-screen keypad. Each time a smart card is inserted into the EPOS terminal, a random keypad arrangement is displayed to the cardholder on the touch-screen keypad for entering his PIN. As a result, an observer is unable to determine a cardholder's PIN merely by observing the finger movement of the cardholder. Similar systems are described in U.S. Pat. No. 5,949,348 and U.S. Pat. No. 4,479,112.

As the PIN of a smart card is stored on the card itself, EPOS transactions occur without the need to send the full authorisation data to the database or authorisation server. In particular, at no time is the PIN stored on the card communicated beyond the EPOS terminal. These publications do not therefore address the problem of others intercepting authorisation data during communications between the EPOS terminal and a remote database server.

Whilst smart cards offer one secure form of authorisation, a card reader must nevertheless be provided at every client terminal in order to read the card and confirm authorisation. Accordingly, smart cards are impractical for many applications, in particular where access to secure data is intended to be granted via the internet. For applications such as online banking, authorisation data continues to be sent between the client terminal (e.g. a home computer) and the database or authorisation server for verification. Although, the authorisation data is normally encrypted, e.g. using public-key encryption, there are concerns that it is only matter of time before methods of decrypting such data are developed.

SUMMARY OF THE INVENTION

There is therefore a need for an improved method of secure remote authorisation between a client terminal and a server, without the need for additional hardware (e.g. a smart card reader) to be provided at the client terminal. It is therefore an object of the present invention to provide a method of authorisation in which the data sent by the client terminal to the server, if intercepted, cannot be used to extract the user's full authorisation data.

In addition, a relatively new trick employed by criminals to fraudulently obtain bank customers' bank authorisation data has become known as 'phishing'. This involves the sending of an email or letter to a bank's internet customers which directs the customers to a website that has the appearance of a webpage of the bank and which asks the customers to enter, in full, their authorisation data-usually on a pretext such as a routine security check. The website is, of course, false and the criminals operating the website are then able to capture and use the customers' authorisation data to arrange for funds to be transferred from the customers' accounts.

A separate further object of the present invention is therefore to provide a method of authorisation which reduces the likelihood of customers being duped by fraudulent phishing attacks.

Accordingly, in a first aspect, the present invention provides a method of secure communication between a server and a terminal remote from the server, the terminal including a user operated data input device, the secure communication method comprising the steps of: communicating encoding data from the server to the terminal, the encoding data being specific to a communication event; generating positional data from data entered by a user using the data input device of the terminal with respect to the encoding data, the positional data consisting of identifiers for the positions of user selected characters of the data input device; communicating the positional data from the terminal to the server; and decoding the positional data received by the server using said encoding data to generate the user entered data.

In a second aspect, the present invention provides a secure communication system comprising a server and at least one terminal remote from and in bi-directional communication with the server, the server comprising: an encoder for generating encoding data specific to a communication event; a communications interface for communicating the encoding data to the remote terminal and for receiving positional data from the terminal, the positional data consisting of identifiers for the positions of user selected characters and being an encoding of user entered data; and a decoder for decoding positional data received from the terminal, the decoder using the encoding data of the encoder to decode the positional data, and each terminal comprising: a manually operated input device for the entry of user data that is encoded as positional data; and a terminal communications interface for receiving encoding data from the server and for communicating positional data to the server.

In a third aspect the present invention provides a secure communication server comprising an encoder for generating encoding data specific to a communication event; a communications interface for communicating the encoding data to a remote terminal and for receiving positional data from the remote terminal, the positional data consisting of identifiers for the positions of user selected characters and being an encoding of user entered data; and a decoder for decoding positional data received from the terminal, the decoder using the encoding data of the encoder to decode the positional data.

In a fourth aspect the present invention provides a method of secure communication between a server and a terminal remote from the server, the terminal including a user operated data input device and display, the secure communication method comprising the steps of: issuing a request for communication to the server from the remote terminal and providing to the server preliminary user identification data specific to the user of the terminal, identifying design data specific to the user and communicating display data from the server to the terminal based on the identified design data; and generating an image on the display of the terminal based upon the display data received from the server wherein further sensitive data is entered by a user only when the image on the display corresponds to an image previously made known to the user.

In a fifth aspect the present invention provides a secure communication system comprising a server and at least one terminal remote from and in bi-directional communication with the server, the server comprising: user design data storage in which is stored display data specific to each user; and a communications interface for communicating the display data to the remote terminal and for receiving user entered data from the terminal, and each terminal comprising: a user operated data input device for the entry of user data; a display; and a terminal communications interface for receiving display data from the server and for communicating user entered data to the server.

In a sixth aspect the present invention provides a secure communication server comprising: user design data storage in which is stored display data specific to each user; and a communications interface for communicating the display data to the remote terminal and for receiving user entered data from the terminal.

BRIEF DESCRIPTION OF THE DRAWINGS

These and other objects, advantages and novel features of the present invention will be more readily appreciated from the following detailed description when read in conjunction with the accompanying drawings, in which.

DETAILED DESCRIPTION OF THE PREFERRED EMBODIMENTS

Figure 1:
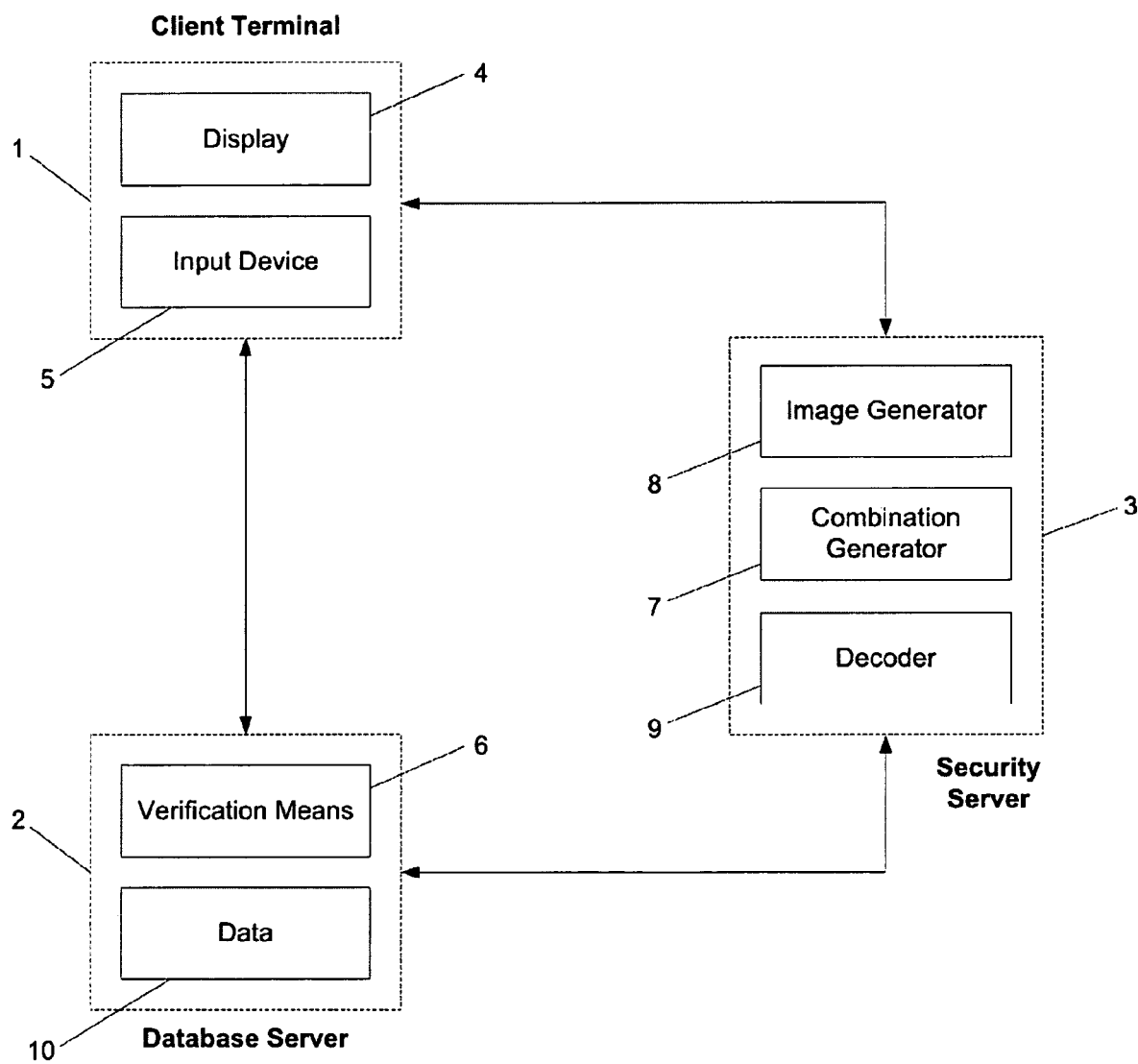
FIG. 1 illustrates an authorisation system in accordance with the present invention.

The authorisation system of FIG. 1 comprises a client terminal 1, a database server 2 and a security server 3, all three of which are in bidirectional communication with one another. With conventional authorisation systems, the security server 3 is absent and the client terminal 1 and database server 2 communicate only with each other.

The client terminal 1 is adapted either in hardware or software to access data remotely stored on the database server 2 and to make changes and/or additions to the remotely stored data. The client terminal 1 includes a display 4 and an input device 5. Suitable devices for the client terminal include, but are not limited to, personal computers, ATMs, mobile phones and PDAs. Indeed, any device capable of external communications and having a display and an input device may be adapted to function as the client terminal 1.

The display 4 of the client terminal 1 may be any device capable of modifying its appearance in order to convey varying information to a user. Whilst a VDU is preferred, the display 4 could alternatively consist of modifiable legends on a keypad or keyboard such that the display 4 and input device 5 are integral. Alternatively, the display 4 and input device 5 may be integrated in the form of a touch-screen display.

The input device 5 is used to input authorisation data, such as a username, password and/or PIN. This authorisation data is subsequently used by the client terminal 1 to gain access to the database server 2. The client terminal 1 may additionally include means for receiving and reading a card, or other identification means, carrying partial authorisation data. For example, the client terminal 1 may be an ATM in which case the card reader of the ATM receives a card carrying the account details of the cardholder, e.g. name, bank sort code and account number. The data carried on the card, however, represents only part of the authorisation data and access to the database server 2 is only granted when additional authorisation data is entered by the user on the input device 5 of the client terminal 1.

The database server 2 stores data 10 intended to be accessed only by authorised personnel and includes means 6 for verifying the authorisation of a user attempting to access the database server 2. The verification means 6 in its simplest form comprises a look-up table containing a list of valid authorisation data. If the authorisation data received by the verification means 6 matches valid authorisation data stored in the look-up table, the user is granted access to the data 10 stored on the database server 2. Preferably, the verification means 6 is adapted to determine the identity of the user from the received authorisation data such that access to the data stored on the database server 2 may be tailored according to the identity of the user, e.g. such that a patient is only able to access his own medical records, or a bank customer is only able to access his own bank details. The verification means 6 may be part of the database server 2 or it may take the form of a separate authorisation server which gates access to the database server 2 until valid authorisation data is received.

The security server 3 comprises a combination generator 7, an image generator 8 and a decoder 9. When a request is received from the database server 2, the combination generator 7 is adapted to generate a random string and an identification code specific to that random string. The random string that is generated will depend upon the content of the authorisation data to be entered by the user on the input device 5 of the client terminal 1 with randomisation occurring over the legitimate character set. For example, if the authorisation data is in the form of a PIN, i.e. if the authorisation data includes only numerals, the random string is ideally 10 characters long, e.g. '7260948135'. Alternatively, if the authorisation data includes both numerals and uppercase letters, the random string may be up to 36 characters long corresponding to 10 numerals (0-9) and 26 letters (A-Z), e.g. 'JR6VSAPKB2G . . . . ' The combination generator 7 communicates both the random string and the identification code to the image generator 8 and to the decoder 9, and communicates only the identification code back to the database server 2. The random string may be generated, for example, by selecting at random, e.g. using a random number generator, an entry from a look-up table of character strings, each character string having a different configuration.

Figure 3:
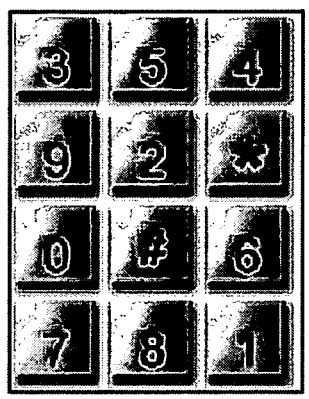
FIG. 3 illustrates exemplary image data generated by the security server of the authorisation system of the present invention.

The image generator 8 takes the random string received from the combination generator 7 and generates image data suitable for display on the client terminal 1. For example, where the client terminal 1 is a personal computer, the image data may consist of an image file (e.g. JPG, GIF, BMP etc) or an HTML file. The generated image comprises at least each character of the random string, wherein the position of each character in the image is determined by the order in which that character appears in the random string. So for example, the first character of the random string may be displayed at the top left of the image whilst the last character of the string is displayed on the bottom right of the image. The generated image preferably retains the same overall design regardless of the random string of characters that is received, and it is only the configuration of the characters within this same overall design that changes with each random string. For example, the image generator 8 might always generate the image of a numerical keypad, in which the arrangement of the numerals on the keypad is changed according to the random string that is received. FIG. 3 illustrates possible image data generated by the image generator 8 upon receiving the string "35492*0#6781".

The image data generated by the image generator 8 should be understood to be any data which the client terminal 1 can use to change the appearance of the display 4. For example, where the display 4 comprises configurable legends on a keypad, the image data might comprise nothing more than the random string received from the combination generator 7. The client terminal 1 on receiving the image data would then modify the legend of the first key of the keypad to display the first character of the random string, modify the legend of the second key to display the second character of the string and so on.

The image data generated by the image generator 8 for a particular random string is assigned the same identification code as that received from the combination generator 7 for that random string. Accordingly, with each request that is received from the database server 2, the security server 3 generates image data and assigns that image data an identification code. The identification code is sent from the security server 3 to the database server, which in turn communicates the identification code to the client terminal 1.

The client terminal 1 uses the identification code to retrieve the corresponding image data generated by the image generator 8 from the security server 3. The client terminal 1 then uses the received image data to modify the appearance of the display 4 so as to present the user with a plurality of characters (e.g. numerals, letters and symbols etc) whose positions are arranged randomly. A user then enters his authorisation data by selecting the individual characters making up his authorisation data, such as a PIN, using the input device 5. The authorisation data entered by the user is recorded as positional data by the client terminal 1. This positional data may then be converted by the client terminal 1 into character data or some other form of data for sending to the security server 3. For example, if the image of FIG. 3 is displayed on the client terminal 1 and the user selects the numerals "7,9,2,0", then the positional data might be 'first-row-first-column, third-row-first-column, third-row-second-column, second-row-first-column'. This positional data might then be converted to "1,7,8,4", which corresponds to the arrangement of numerals on a conventional numerical keypad. Thus positional data or the character data to which it may be converted represents an encoded form of the authorisation data. This encoded authorisation data (e.g. "1,7,8,") can only be decoded by knowing either the image data or the random string specific to that identification code and the method used to generate the image data. After authorisation data has been entered by a user, the encoded authorisation data and the identification code specific to the displayed image data are sent by the client terminal 1 to the security server 3 where it is decoded by the decoder 9.

The decoder 9 stores each random string and identification code that is received from the combination generator 7. When the encoded authorisation data and the identification code are received from the client terminal 1, the decoder 9 decodes or extracts the true authorisation data using the corresponding random string, i.e. the random string having the same identification code. The decoded authorisation data is then sent from the decoder 9 of the security server 3 to the database server 2.

In use, the client terminal 1 first sends a request (S1) for access to the database server 2. This request may be performed by establishing a connection between the client terminal 1 and the database server 2. Alternatively, the user may first be required to input partial authorisation data, e.g. a username. If the partial authorisation data is valid then this constitutes a request for access. Once a valid request for access has been received by the database server 2, the database server 2 issues a request (S2) for a terminal display identification code from the security server 3. The database server 2 may also acknowledge the client terminal's request for access by communicating to the client terminal a transaction identification code specific to this access request. This transaction identification code is different from the identification code requested from the security server. The combination generator 7 then generates a random string and a terminal display identification code (S3), both of which are communicated to the image generator 8 and the decoder 9. The image generator 8 then generates image data (S4) suitable for display on the client terminal 1 and assigns the image data the same terminal display identification code.

The terminal display identification code is sent from the security server 3 to the database server 2, which in turn sends the identification code to the client terminal 1 (S5). Accordingly, the client terminal 1 receivers from the database server 2 a unique transaction identification code specific to the transaction in progress and also a terminal display identification code. The client terminal 1 then uses the terminal display identification code to request image data from the security server 3 (S6). The image data generated by the image generator 8 specific to that particular identification code is then returned by the security server 3 to the client terminal 1 where it is displayed.

The user then enters his authorisation data (S7) using the image data presented on the client terminal 1. Owing to the random arrangement of characters displayed on the client terminal 1, the authorisation data entered by the user is encoded. The encoded authorisation data and the terminal display identification code are then sent (S8) from the client terminal 1 to the security server 3 where they are received by the decoder 9. The decoder 9 decodes the encoded authorisation data (S9) using the terminal display identification code to identify the corresponding random string that has been used to encode the authorisation data. Once decoded, the true authorisation data is communicated (S10) from the security server 3 to the database server 2. The true authorisation data is then checked by the verification means 6 (S11) and if the verification means 6 determines that the authorisation data received from the security server 3 is valid, access to the database server 2 is granted to the user (S12). Otherwise, the database server 2 communicates to the client terminal 1 that the authorisation data was invalid (S13) and in accordance with current banking practice invites the user to re-enter his PIN up to a maximum of three attempts. If invalid, the database server 2 may additionally request a new terminal display identification code from the security server 3 which will also result in turn with new image data being delivered to the client terminal 1, so as to begin the process anew.

The image data retrieved from the security server 3 by the client terminal 1 serves as the code for encoding the authorisation data entered by the user. In displaying the encoding data on the terminal 1 and using this displayed data to enter user authorisation data, the data entered by the user is immediately encoded, i.e. the user in effect enters encoded authorisation data. The client terminal 1 need not therefore separately encode data entered by the user. In particular, the client terminal 1 does not receive and then encode the true authorisation data entered by the user. Instead, the user, without knowing, enters encoded authorisation data. As a result, there is no need for the client terminal 1 to include processing means to encode the authorisation unless separately required for the purposes of communication with the database server and/or the security server. Indeed, encoded authorisation data may be achieved through the use of a dumb terminal, i.e. a terminal 1 comprising nothing more than display means 4 and input means 5.

Where the input means 5 of the client terminal 1 has a plurality of manually individually operable buttons or keys that are in fixed positions with respect to each other and each of which is allocated to a respective character, the security server 3 may issue to the client terminal a 'virtual map' in which the positions of specific keys of the keyboard e.g. the alphanumeric sequence, are each allocated their own identifier. Each position identifier is selected to be different to the actual character of that key on the keyboard. Thus, where the identifiers are alphanumeric symbols, in effect the virtual map swaps around characters for the individual keys of the keyboard. By employing the virtual map to communicate a user's keystrokes to the security server, although the user's keyboard remains the same and the authorisation data is entered in the usual manner, the authorisation data entered by the user which is communicated back to the security server 3 is encoded in the form of positional data with respect to the virtual map. This system is particularly suited for example to circumstances such as the use of a home pc when conducting on-line banking.

The use of identification codes enables multiple client terminals 1 to access the database server 2 and the security server 3 simultaneously. However, the use of identification codes may be omitted should the authorisation system be set-up such that only one user, or client terminal 1, is capable of accessing the database server 2 at any one time. In this case, identification codes are not needed since only one random string is generated and used by the security server 3 at any one time.

Each identification code may consist of, or include, a URL to a website. The image data generated by the image generator 8 is then stored in the form of a web document, e.g. HTML or XML file or Java applet etc. Thus, a unique and temporary URL is returned to the client terminal 1 in response to a request from the client terminal 1 for access to the database server 2. The client terminal 1 uses the URL to load the contents of the relevant website to display the image data. The URL preferably includes no data that would enable spoofing.

Once the decoder 9 has decoded the encoded authorisation data received from the client terminal 1, the corresponding random string stored in the decoder 9 is preferably deleted from the security server 3. In deleting the random string from the security server 3, a person intercepting the encoded authorisation data is unable to resend this encoded data to the security server 3 in order to gain access to the database server 2. Should the decoder 9 receive encoded data having a non-existent identification code, the security server 3 may be configured to issue an alert of a potential security breach. Similarly, the image data generated by the image generator 8 is also preferably deleted after the security server 3 receives the encoded authorisation data. This then prevent others, having intercepted the encoded authorisation data sent from the client terminal 1, from extracting the terminal display identification code and requesting the corresponding image data from the security server 3. Alternatively, or indeed additionally, the image data and/or random string may have a limited lifetime for example 5 minutes which is sufficient for most ATM transactions. As a result, the user may be timed-out should he take too long in entering his authorisation data.

With the authorisation system described above, the authorisation data is never sent un-encoded from the client terminal 1. Moreover, as the encoded authorisation data sent by the client terminal 1 is encoded using a random string, it is extremely difficult if not impossible for others intercepting only the encoded data to extract the authorisation data. Additionally, as the authorisation data is entered by selecting characters having a random configuration, it is significantly more difficult for a person observing a user to visually acquire the user's authorisation data.

It is intended that the communication link between the database server 2 and the security server 3 is itself secure, e.g. by means of an internal or dedicated line that is not accessible externally. Consequently, there is no need to encode the authorisation data sent between the secure server 3 and the database server 2. However, where communications between the database server 2 and the security server 3 are not secure, the decoder 9 of the security server 3 preferably re-encodes the decoded authorisation data using a one-way-hashing algorithm before sending the hashed authorisation data to the database server 2. Rather than storing a list of actual authorisation data, the verification means 6 of the database server 6 instead stores only hashed authorisation data. This additional step of hashing the authorisation data has the added security that authorisation data is never stored in un-encoded form on either the database server 2 or the security server 3. Consequently, anyone compromising the security of either server 2,3 is unable to extract authorisation data.

In order to further improve security, all communications within the authorisation system, i.e. between servers 2,3 and with the client terminal 1, are preferably encrypted using 128 bit SSL protocol, for example.

Importantly, by separating the various parts of the user's identification information and authorisation data, the inherent security of the system is greatly enhanced. In order to compromise the user's account an observer must capture and decode communications (i) between the client terminal 1 and the database server 2; (ii) between the client terminal 1 and the security server 3; and (iii) between the security server 3 and the database server 2. By separating the flows of data into three distinct and separate paths, and with each datapath carrying significantly less data, it becomes much more difficult if not impossible for an observer to breach the security of the system. Thus, even if an observer were to succeed in decoding one of the datastreams, without the information contained in the other two datastreams relating to the same transaction, the decoded information is useless. Moreover, as the identification data is communicated to the database server 2 in association with a transaction identification code whereas the authorisation data is communicated to the security server 3 in association with a terminal display identification code, the two datastreams have no common data to enable an observer to determine the datastreams are related to the same account.

Illicit acquisition of authorisation data by intercepting both the image data and the encoded authorisation data sent between the client terminal 1 and the security server 3 can be undermined by further improving the security of the authorisation system by encrypting the image data and the encoded authorisation data with different encryption keys. By using different encryption keys to encrypt the image data and the encoded authorisation data, the task of decrypting the data to obtain the authorisation data is more than doubled. This is because the task of decryption becomes increasingly difficult as the size of the encrypted data decreases. As the image data may comprise little more than a random string of characters (e.g. the numerals 0-9) and the encoded authorisation data may comprise little more than a few select characters (e.g. a PIN), the size of the data to be encrypted is typically only a few tens of bytes. As a result, the encrypted data is extremely resistant to brute force methods of decryption.

Separate encryption keys for the image data and encoded authorisation data is possible by employing two communication paths between the client terminal 1 and the security server 3, with each communication path employing a different encryption key. For example, the security server 3 may include two servers, the first server storing the image data generated by the image generator 8 and the second server storing the encoded authorisation data received from the client terminal 1. The client terminal 1 then requests image data from the first server, which is encrypted using a first key, and sends the encoded authorisation data to the second server using a second encryption key.

Although the authorisation system preferably includes a separate database server 2 and security server 3, the combination generator 7, the image generator 8 and the decoder 9 may all form part of the database server 2. In which case, the security server 3 is omitted and the client terminal 1 communicates only with the database server 2. The database server 2, upon receiving a request for access from the client terminal 1, returns an identification code and image data to the client terminal 1. The client terminal 1 then sends the encoded authorisation data and identification code to the database server 2, whereupon the encoded authorisation data is decoded and its validity verified. As described above for the security server 3, the database server 2 may include two servers employing different encryption keys for separately communicating the image data and the encoded authorisation data. The first server is responsible for receiving a request for access from the client terminal 1 and returning the identification code and image data, whilst the second server is responsible for receiving the encoded authorisation and identification code from the client terminal 1.

Whilst reference has thus far been made to an authorisation system for gaining access to data stored on a database server 2, the authorisation system may be used in any situation in which authorisation needs to be verified remotely. For example, the authorisation system may be used to gain access to a secure building. In this case, the client terminal 1 may be a keypad adjacent a door and the database server 2 upon receiving valid authorisation data from the security server 3 sends a signal to the door to open.

With the authorisation system and method of the present invention, the authorisation of a user may be verified remotely, across potentially non-secure communications, in a more secure manner than is presently possible. In particular, the authorisation of the user may be verified without data being sent by the user which, if intercepted, could be used to extract the user's authorisation data.

A further development of the authorisation system and method described above is illustrated in FIG. 4; the system is similar to the system illustrated in FIG. 1 and like reference numerals have been used where appropriate. This further development is particularly suited for use with a client terminal 1 having a display such as an LCD, plasma or CRT display. The database server 2 additionally includes a look-up table 11 in which is stored a list of users or customers with each user assigned a design code such as an alphanumeric string which is preferably, but not necessarily, unique to an individual user. In the security server 3 a display data decoder 12 is additionally provided. The display data decoder 12 is programmed to decode the design codes of each user and to communicate the design data to the image generator 8.

Figure 5:
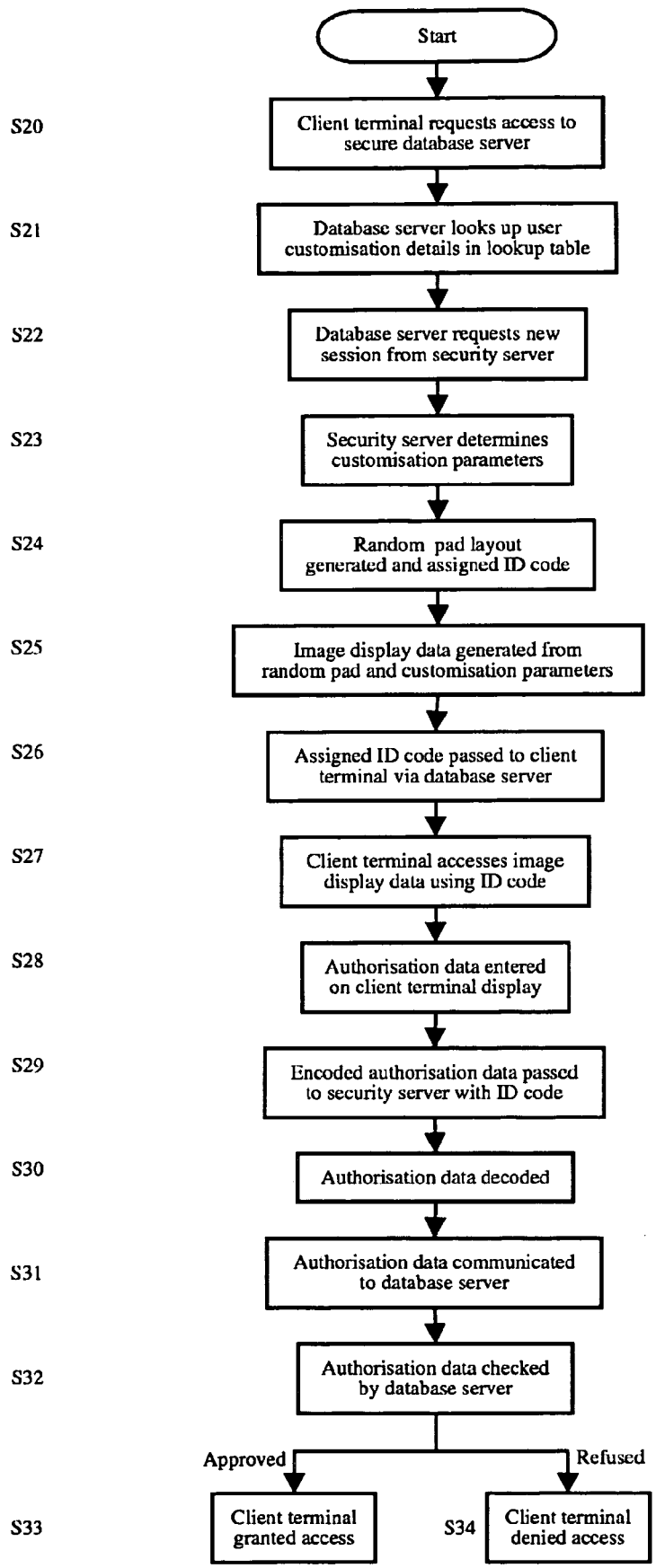
FIG. 5 is a simplified diagram of the data exchanges that are performed in accordance with a second embodiment of the data communication method of the present invention.

The design data defines features of the image to be displayed by a client terminal when the user of the terminal is prompted to enter their authorisation data such as their PIN number. Hence, the webpage that is presented to each user is tailored and is preferably unique to each user. Moreover the same user is always presented with the same webpage but the design of the webpage varies between users. Examples of what the design data may define are: the font size of the lettering/numbering on the webpage; the background colour of the webpage; the colour of the individual selectable keys; the colour of a border around the keys; the shape of the individual keys; the shape of any border around the keys; as well as any decorative details such as patterning or additional images. FIG. 5 illustrates a webpage with a rectilinear patterned border to an alphanumeric electronic keypad. It will, of course, be apparent that the design variations of the webpage are not limited to the examples given above and that there are an extremely large number of features the design of which can vary without detracting from the function of the webpage which is to enable a user to enter their authorisation data.

With the authorisation system illustrated in FIG. 4, the method of authorisation is as follows. The remote terminal 1 requests access (S20) to the database server 2. In reply the database server 2 informs the remote terminal of the session id for this communication session and prompts the remote terminal for preliminary identification of the user requesting access. This could be the user's name or their account number, for example. Once the user has entered their preliminary identification the remote terminal 1 communicates the identification information with the session id to the database server 1. The database server 2 then identifies from the look-up table 11 the design code for that user (21) and communicates the design code to the security server 3 with a request for a new session (S22). The security server 3 determines from the design code (23) the design features for the log-on page specific for that user. Optionally a randomised arrangement of the individual button of the keypad is generated (24), as described above with reference to FIG. 2. The image generator 8 then creates a log-on page (S25) employing the user's design features and communicates the URL for that log-on page along with a separate session id specific to communication session concerning that user between the database server and the security server (S26). The database server 2 then communicates the URL to the remote terminal 1 which accesses the URL (S27) and displays the particular log-on webpage for that user. Assuming the log-on webpage is familiar to the user, the user's authorisation data is then entered (S28) and communicated by the remote terminal 1 in its encoded form as a result of the re-arrangement of the keypad to the security server 3 (S29). The security server 3 subsequently decodes the positional key data (S30) to identify the user's true authorisation data which is then communicated to the database server 2 (S31) using the session id unique to the communication session between the database server and the security server. The database server 2 then compares (S32) the authorisation data received from the security server 3 with the authorisation data it already has recorded for that user. Assuming the authorisation data is correct, the database server 2 then grants access (S33) to the secure system requested by the user at the remote terminal 1 or refuses access (S34) where the authorisation data is incorrect.

Figure 2:
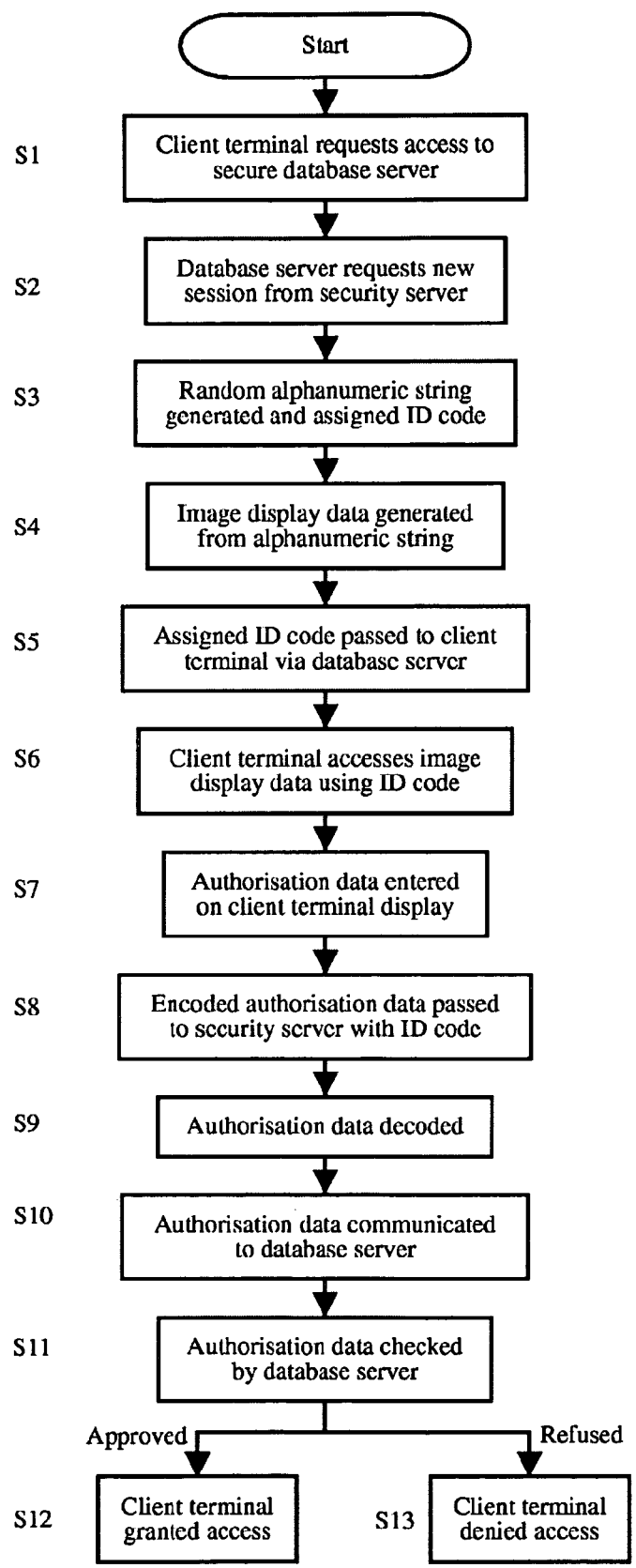
FIG. 2 is a simplified diagram of the data exchanges that are performed in accordance with a first embodiment of the data communication method of the present invention.

Thus, it will be apparent from the above, that like the authorisation method of FIG. 2, the necessary authorisation information is broken up into segments and different segments are exchanged between different communication combinations of the remote terminal, the database server and the security server. No single communication exchange contains all the identification and authorisation data. Moreover, the individual data packets, each of which is preferably encrypted, are not large enough to enable someone to crack the encryption using current code-cracking techniques. The identification and authorisation data are broken up into at least two segments with each segment employing a different session id and a different communication link.

It is envisaged that a user may be given the opportunity to select their own design variations which are then stored in the look-up table 11 of the database server 2. However, this would require the full range of design variations to be publicly available. It is therefore preferred that the design variations are selected by the bank so that the available permutations are kept secret.

With this system the users are encouraged to become familiar with the design of the webpage that is presented to them each time they are prompted for their authorisation data. This familiarity with their own, preferably unique, webpage means that if an attempt is made to obtain a user's authorisation data by phishing, the user will be presented with a webpage that does not include the design details with which the user has become familiar. This enables a user to distinguish between a valid webpage issued by the bank and a phishing webpage.

It will, of course, be apparent that this system which presents each user with their own, personalised, log-on webpage need not additionally involve the reorganisation of the ordering the individual keys or buttons. That is to say, the combination generator 7 is optional in FIG. 4. However, even without re-ordering of the keys or buttons, the system still offers improved security over known systems as the authorisation data entered by the user is communicated to the security server 3 under a communication id unique to the transaction between the remote terminal and the security server and is separate from the communication id assigned to the communication between the client terminal 1 and the database server 2. Hence, the user identity which is communicated to the database server 2 remains separate from the authorisation data that is communicated to the security server 3. Thus, the three-way communication described above with respect to the authorisation system of FIG. 1 is also provided with the authorisation system of FIG. 4.

Of course, where the combination generator 7 is additionally implemented in the authorisation system an even higher level of security is achievable and fully addresses concerns over the risks of phishing as well as the concerns that cards can be stolen once the entry of a PIN number has been monitored.

Figure 6:
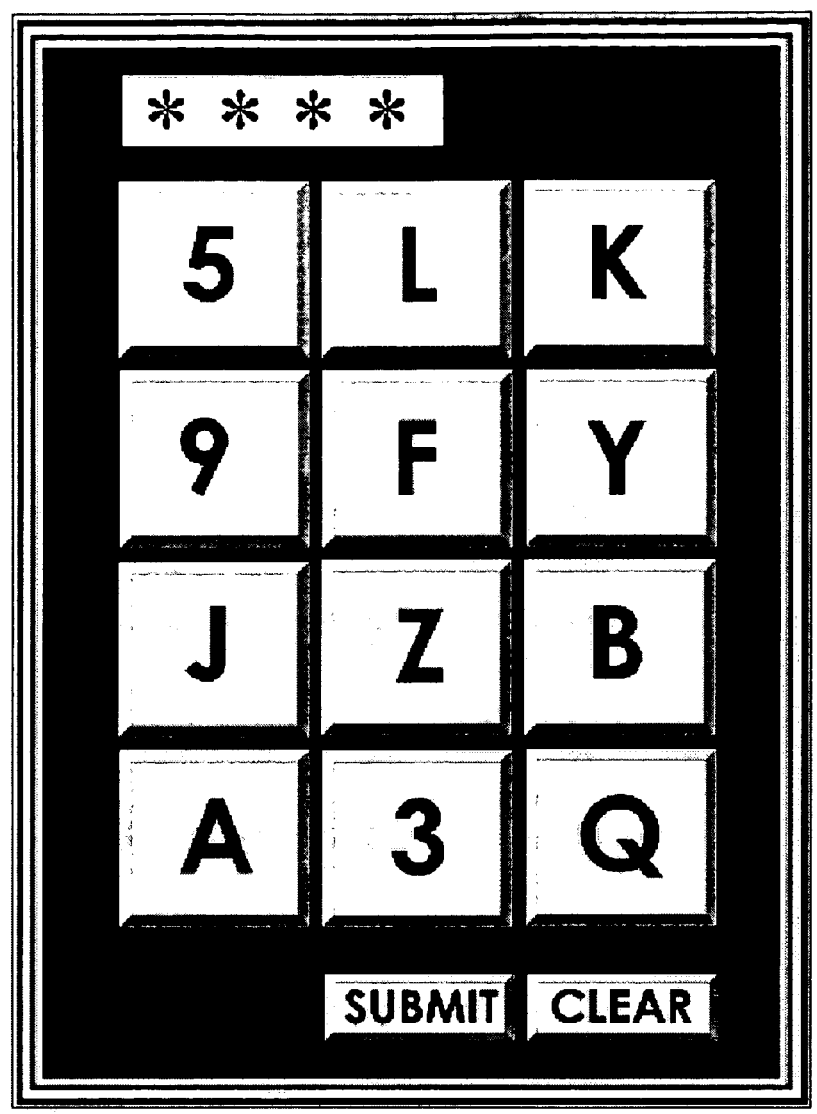
FIG. 6 illustrates exemplary image data employing alphanumeric characters generated by the security server of the authorisation system of FIG. 4.

The authorisation system of FIG. 1 was described with respect to the need for a series of individually numerically labelled keys or buttons to be displayed. However, in order to offer a further level of security the present invention envisages the option of the keys or buttons to be individually labelled with a mixture of numbers and letters as illustrated in FIG. 6. With this added feature, the log-on webpage would present an arrangement of a plurality of keys, for example a 3×4 array, which does not include a key for each possible number or letter. However, as determined by the design code stored in the look-up table 11, the webpage will include the numbers and letters the user needs to enter their authorisation code. Thus someone wishing to replicate the log-on page for the purposes of phishing must not only guess for each user the right collection of design features from a wide range of possible design permutations but must also now select from the range of ten numbers and twenty six letters (assuming English lettering) the correct sub-group of letters and numbers which includes the authorisation data for that user.

Figure 7:
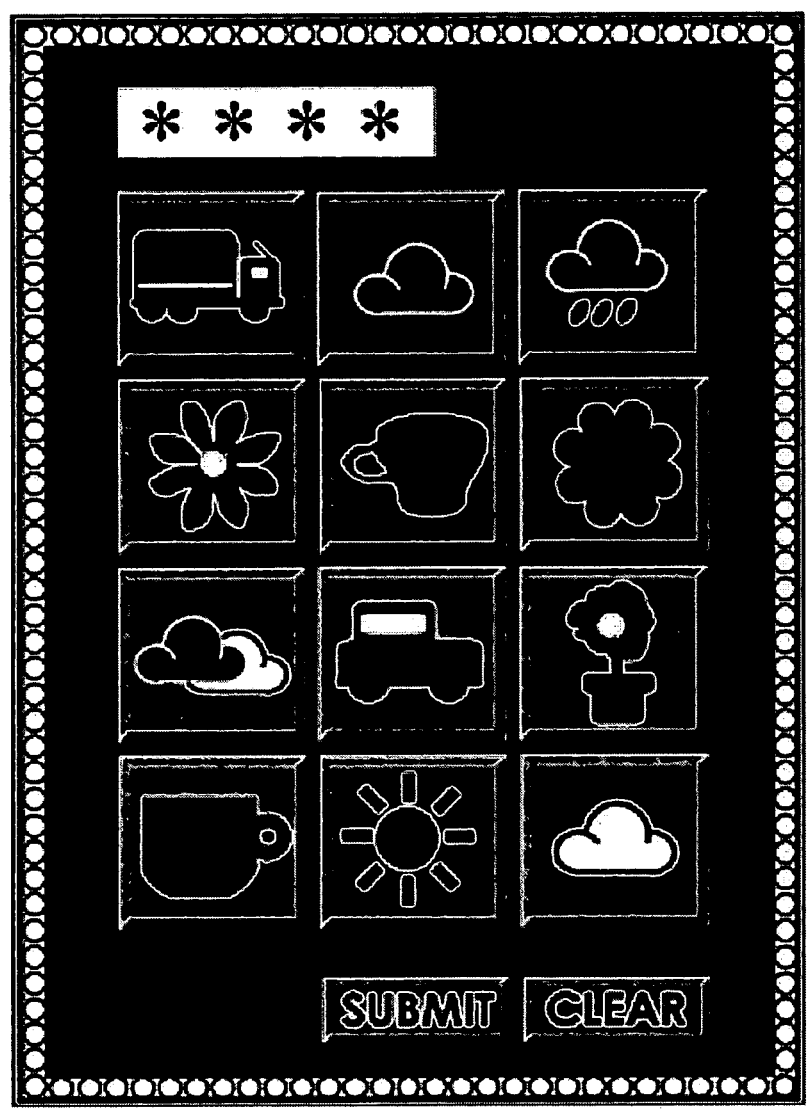
FIG. 7 illustrates exemplary image data employing non-alphanumeric characters generated by the security server of the authorisation system of FIG. 4.

A further development of the same concept involves the use of non-alphanumeric graphics for each key. As illustrated in FIG. 7 cartoons or image thumbnails of any distinguishable character can be employed with the authorisation system. Thus, in FIG. 7 the keys include cartoon images of a lorry, a cloud, a flower, a cup etc. These characters are in addition to the distinctive design of the keypad as a whole which in this case involves a border of adjacent circles. The user then selects the three or four keys from the array of keys which constitute their authorisation data. In FIG. 7 the authorisation data comprises 1) car, 2) raincloud, 3) sun and 4) flower-pot.

With a set of, for example, 256 different characters or symbols and an array of 12 keys, there are $6.1 \times 10^{28}$ possible combinations that could be displayed to a user. Also, with the same 256 different characters there are 4.2 billion different 4 character PINs. As a result, the chance of a user being able to enter their PIN, if an attempt at phishing is made, is 1 in 3.4 million.

Furthermore, it is believed that this further development of the authorisation system may offer additional advantages to users. This is because many users experience difficulties in remembering their authorisation data such as their PIN number. It is believed that users will find these images easier to recall individually and in their right order as they are more suited to recollection by means of a cognitive sequence or story.

Figure 4:
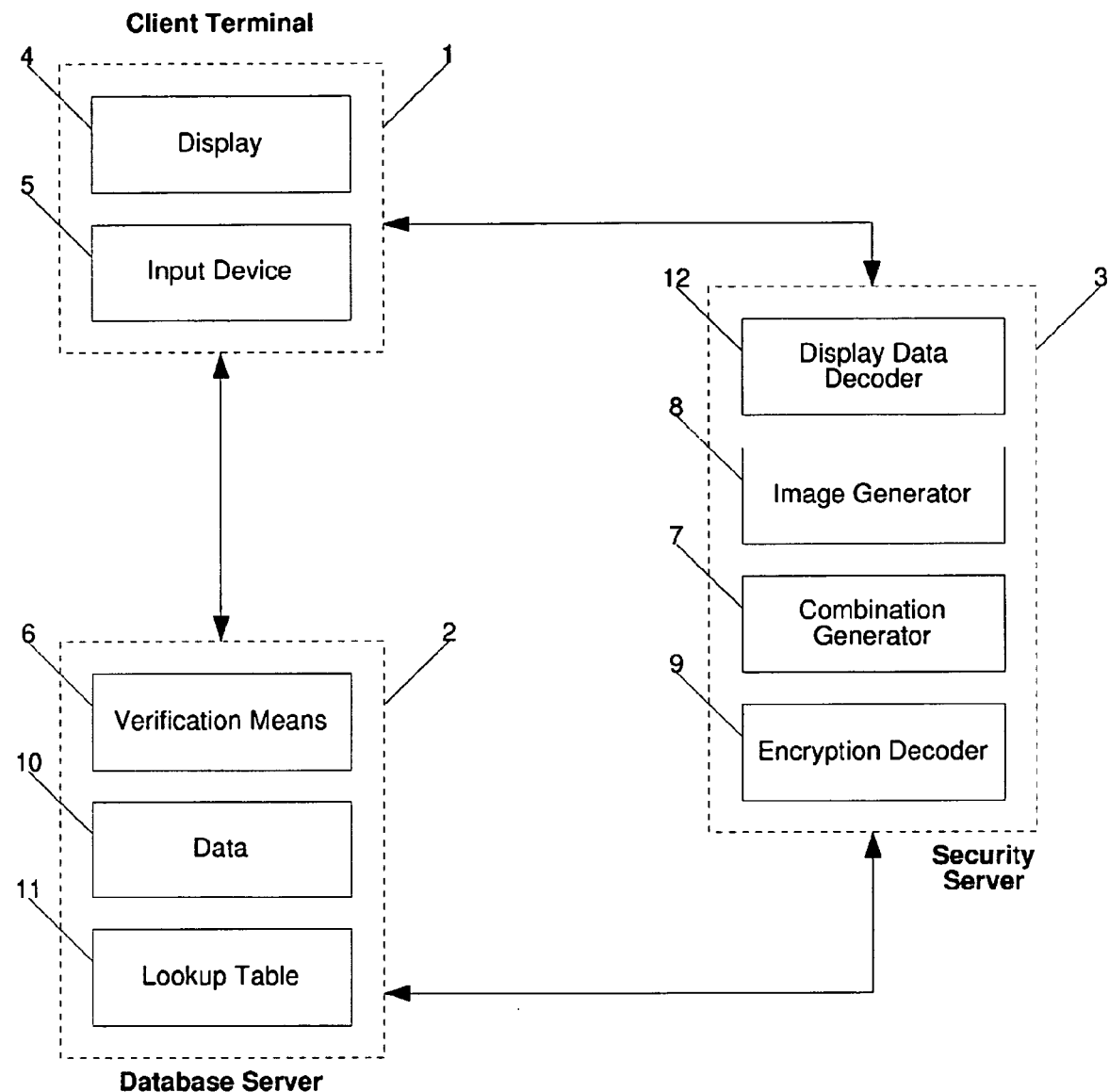
FIG. 4 illustrates an alternative authorisation system in accordance with the present invention.

An additional benefit of the secure system of FIG. 4 is that the design of the keyboard displayed to a user can be selected to accommodate sight disabilities. For example, the images displayed could be presented with a higher than normal contrast or larger than normal for those with restricted vision. It is also envisaged that the design data could incorporate audio features for users having extremely limited or no visual acuity. Particularly in the case where the remote terminal is a home computer, the individual keys of the display may be each allocated a separate sound, preferably a brief description of the character of the key. A user will then be permitted to tab across the keys to hear the different sounds without the keys being selected. On hearing a key specific to the user's authorisation code, a user will then be able to select the key by pressing the enter button on their keyboard, for example. Alternatively, the system may be adapted so that keys are only selected if the same key is selected twice successively. So that the first selection of a key by the user only triggers an audio description of the key, repeating the selection thereafter would then treat the key as selected for the purposes of the user's authorisation code. It will, of course, be understood that this invention is intended to encompass alternative procedures for enabling a user to hear the different sounds associated with the keys without key selection for the purposes of entering the user's authorisation data. In this way the present invention additionally offers to users having sight disabilities the benefit of electronic access to secure data, such as home banking, previously unavailable to them.

Whilst the secure communication systems described above are concerned with communicating authorisation data, it will, of course, be apparent that the secure method of communication embodied in these systems is suitable for the communication of any sensitive information and in particular the step of checking the validity of authorisation data entered by a user is not an essential feature of the invention.

The authorisation systems of the present invention thus offer significantly improved security over known electronic log-on systems as they break up the identification and authorisation data into a plurality of segments with at least one of the segments being communicated under a different identifying session code to that of another segment and/or a different communications link. The authorisation system of FIG. 4 additionally offers a significantly reduced risk that a customer or user might be misled into entering their authorisation data to a phishing site. As phishing scams are believed to have cost banks and credit-card companies losses of around $10.2 billion in 2003 the need for this security risk to be addressed is currently acute.

Although only a few exemplary embodiments or the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method of secure communication between a server and a terminal remote from the server, the terminal including a user operated data input device, the secure communication method comprising the steps of:

receiving a request from said terminal over a first communication pathway encrypted using a first encryption key, the request being an access request for access to the server;

communicating encoding data from the server to the terminal, the encoding data being specific to a communication event;

generating positional data from data entered by a user using the data input device of the terminal with respect to the encoding data, the positional data consisting of identifiers for the positions of user selected characters of the data input device;

communicating over a second communication pathway, the positional data from the terminal to the server, the positional data being encrypted using a second encryption key; and decoding the positional data received by the server using said encoding data to generate the user entered data;

wherein the second communication pathway is separate from and different to the first communication pathway and the first and second encryption keys are different such that the risk is reduced that the data sent from the terminal, if intercepted, could be used to extract the user's full authorization.

2. A method as claimed in claim 1, wherein the terminal includes a display and the method further comprises the step of displaying a plurality of characters on the display, the position of each of the characters on the display being determined with respect to said encoding data.

3. A method as claimed in claim 1, wherein the terminal includes a display and the encoding data identifies an arrangement of characters to be displayed.

4. A method as claimed in claim 2, wherein a plurality of characters to be displayed on the display comprise a sub-set of the complete set of alphanumeric characters.

5. A method as claimed in claim 2, wherein a plurality of characters to be displayed on the display comprises non-alphanumeric user distinguishable characters.

6. A method as claimed in claim 2, wherein a plurality of characters to be displayed on the display comprises non-alphanumeric user distinguishable characters and the encoding data includes a sub-set of non-alphanumeric characters taken from a larger set of non-alphanumeric characters.

7. A method as claimed in claim 1, wherein said encoding data comprises a string of numerals in random order.

8. A method as claimed in claim 2, further comprising the step of communicating to the terminal a webpage URL wherein the encoding data is embodied in said webpage URL and the step of displaying a plurality of characters on the display comprises displaying the contents of the webpage on the display.

9. A method as claimed in claim 1, wherein said input device is a keyboard and said encoding data comprises a virtual map assigning unique identifiers to each of the positions of a selected group of keys on the keyboard.

10. A method as claimed in claim 1, wherein the encoding data is generated by a security server which is communicated to said terminal and said positional data is communicated by the terminal to said security server where the positional data is decoded to extract the user entered data which is communicated from the security server to said server.

11. A method of authenticating a server to a user of a terminal remote from the server, the terminal including a user operated data input device and display, the authenticating method comprising the steps of:

issuing a request for communication to the server from the remote terminal and providing to the server preliminary user identification data specific to the user of the terminal, identifying and accessing from design data storage at the server, which design data storage contains design data for a plurality of users, design data specific to the user and communicating display data from the server to the terminal based on the identified design data, the design data defining features of an image to be displayed to the user of the terminal; and generating an image on the display of the terminal based upon the display data received from the server;

wherein the step of identifying and accessing design data specific to the user includes the step of selecting for the user from a set of user selectable authorization data a sub-group of user selectable authorization data which is different for different users, whereby the image generated on the display of the terminal includes the selected sub-group only of authorization data, and whereby the server is authenticated to the user by means of the image which includes authorization data sufficient for the user to select and enter their authorization data and the likelihood of a fraudulent phishing site displaying authorization data sufficient for a user's authorization data to be entered is reduced.

12. A method as claimed in claim 11, wherein the display data includes data on one or more of: a pre-selected border pattern; one or more pre-selected colours; and a pre-selected button shape.

13. A method as claimed in claim 11, wherein for visually impaired users the display data includes data in one or more of: pre-selected high contrast colours; and larger than normal selectable characters.

14. A method as claimed in claim 11, wherein audio data related to the display data is communicated to the terminal from the server.

15. A secure communication system comprising a server and at least one terminal remote from and in bi-directional communication with the server, the server comprising: an encoder for generating encoding data specific to a communication event; a communications interface for receiving on a first communication pathway an access request from a remote terminal which commences the communication event, the access request being encrypted using a first encryption key, and for communicating the encoding data to the remote terminal and for receiving on a second communication pathway positional data from the remote terminal, the positional data being encrypted using a second encryption key and consisting of identifiers for the positions of user selected characters and being an encoding of user entered data; and a decoder for decoding the positional data received from the remote terminal, the decoder using the encoding data of the encoder to decode the positional data, and each terminal comprising: a manually operated input device for the entry of user data that is encoded as positional data; and a terminal communications interface for receiving encoding data from the server and for encrypting and communicating access requests to the server on said first communication pathway and positional data to the server on said second communication pathway wherein the second communication pathway is separate from and different to the first communication pathway and the first and second encryption keys are different such that the risk is reduced that the data sent from the terminal, if intercepted, could be used to extract the user's full authorization.

16. The secure communications system as claimed in claim 15, wherein the user entered data comprises authorization data and the server further includes data storage in which valid authorization data is stored against which authorization data decoded by the decoder is validated.

17. The secure communications system as claimed in claim 15, wherein the terminal further comprises a display on which a plurality of characters are displayed, the position of each of the characters on the display being determined with respect to said encoding data and the server includes a user display design data storage in which is stored design data specific to each user, the design data dictating features of an image to be displayed on the terminal display including said plurality of characters.

18. The secure communications system as claimed in claim 15, wherein the server and the at least one remote terminal each further comprise public-key encrypting means for encrypting communications between the server and terminal.

19. A secure communication server comprising an encoder for generating encoding data specific to a communication event; a communications interface for receiving on a first communication pathway an access request from a remote terminal which commences the communication event, the access request being encrypted using a first encryption key, and for communicating the encoding data to the remote terminal and for receiving on a second communication pathway positional data from the remote terminal, the positional data being encrypted using a second encryption key and consisting of identifiers for the positions of user selected characters and being an encoding of user entered data; and a decoder for decoding positional data received from the terminal, the decoder using the encoding data of the encoder to decode the positional data wherein the second communication pathway is separate from and different to the first communication pathway and the first and second encryption keys are different such that the risk is reduced that the data sent from the terminal, if intercepted, could be used to extract the user's full authorization.

20. A secure communication system comprising a server and at least one terminal remote from and in bi-directional communication with the server, the server comprising:

user design data storage in which is stored data specific to each user of a plurality of users, the design data defining features of an image to be displayed to a respective user of the terminal; and a communications interface for communicating display data based on design data specific to a user of the remote terminal, and for receiving user entered data from the terminal, the server being configured to identify and access design data specific to the user from the user design data storage which includes selecting for the user from a set of user selectable authorization data a sub-group of user selectable authorization data which is different for different users, so that the display data includes the selected sub-group only of authorization data; and each terminal comprising: a user operated data input device for the entry of user data; a display; and a terminal communications interface for receiving display data from the server and for communicating user entered data to the server whereby the server is authenticated to the user by means of the display data which includes authorization data sufficient for the user to select and enter their authorization data and the likelihood of a fraudulent phishing site displaying authorization data sufficient for a user's authorization data to be entered is reduced.

21. A secure communication system as claimed in claim 20, the server further including an encoder for generating encoding data specific to a communication event and a decoder for decoding positional data received from the terminal, the positional data consisting of identifiers for the positions of user selected characters and being an encoding of user entered data, the decoder using the encoding data of the encoder to decode the positional data, and wherein the communications interface is adapted to communicate the encoding data to the remote terminal and for receiving the positional data from the terminal.

22. A secure communication server comprising: user design data storage in which is stored design data specific to each user of a plurality of users, the design data defining features of an image to be displayed to a respective user of a remote terminal; and a communications interface for communicating display data to a remote terminal, the display data being based upon design data specific to a user of the remote terminal and comprising a sub-group of user selectable authorization data specific to the user, the sub-group being taken from a set of authorization data and being different for different users, and for receiving user entered data from the remote terminal.

* * * * *